Nov. 27, 1951     C. A. COX     2,576,714
SLIDE HOLDER FOR PROJECTORS

Filed March 9, 1948     3 Sheets-Sheet 1

INVENTOR.
CHESTER A. COX
BY
J. D. Douglas

Nov. 27, 1951     C. A. COX     2,576,714
SLIDE HOLDER FOR PROJECTORS

Filed March 9, 1948     3 Sheets-Sheet 2

INVENTOR
CHESTER A. COX
BY
J. D. Douglas

Nov. 27, 1951 C. A. COX 2,576,714
SLIDE HOLDER FOR PROJECTORS
Filed March 9, 1948 3 Sheets-Sheet 3

INVENTOR.
CHESTER A. COX
BY
J. D. Douglass

Patented Nov. 27, 1951

2,576,714

UNITED STATES PATENT OFFICE 2,576,714

SLIDE HOLDER FOR PROJECTORS

Chester A. Cox, Cleveland, Ohio

Application March 9, 1948, Serial No. 13,873

8 Claims. (Cl. 88—27)

1

This invention relates to apparatus for the projection of pictures, and more particularly to a slide holder which can be used to adapt projectors that are arranged to show single slides, for the projection of slides having a greater number of pictures per slide.

As is well known to those versed in the art, there are numerous devices on the market for the projection of positive or colored transparencies. These devices are usually arranged to show pictures which are mounted with only one picture in a mount. The most common of these projections are those which take standard two inch by two inch slides.

There are also available for public consumption circular paper discs having a plurality of colored pictures. These are most commonly used with a hand viewer and are the stereoscopic type, wherein third dimensional effect is realized. The disc bearing the pictures is placed in the viewer and is rotated by a lever to bring to view the succeeding scenes.

The present invention is particularly concerned with an adaptor which may be used in conjunction with the standard projector and enable the scenes to be projected without the third dimensional effect, thus making available to the owner of a standard projector the benefit of these pictures. The owner then can project these slides which are relatively cheap, with a minimum of expense for equipment.

Still other advantages of the invention and the invention itself will become more apparent from the following description of some embodiments thereof which description is illustrated by the accompanying drawings and forms a part of this specification.

2

Figure 9:
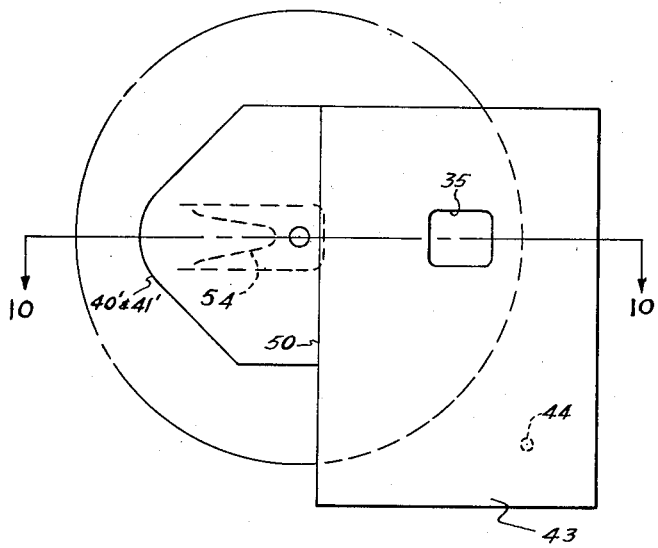

Fig. 9 is a front elevational view of a modified form of the invention; and

Figure 10:
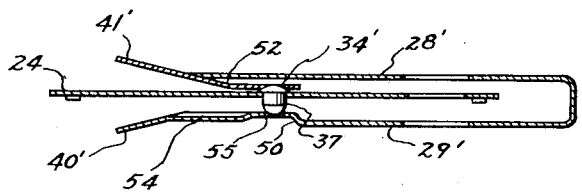

Fig. 10 is an edge view thereof.

Throughout the drawings like parts have been designated by like reference characters.

Briefly speaking, my device comprises an adaptor for replacing the standard slide holder of a projector and into which the picture discs may be quickly inserted and removed. I also provide a holder for the picture disc which increases the useful life thereof and also since the disc holders are for three dimensional showing, blocks off certain of the pictures which would otherwise be projected upside down.

Figure 1:
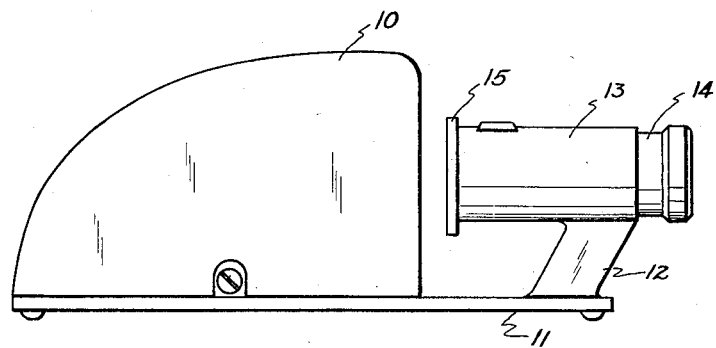
Fig. 1 is a side elevational view of a well known slide projector, with which the device of my invention may be used.
Figure 2:
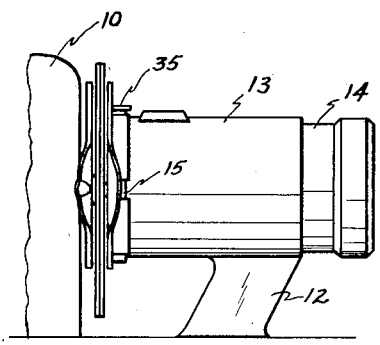
Fig. 2 is an enlarged fragmentary view thereof showing the device of my invention in position.
Figure 3:
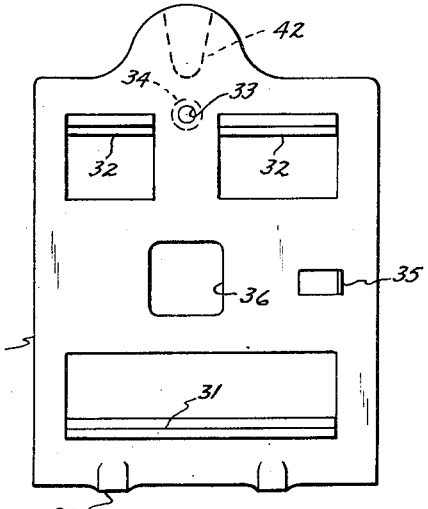
Fig. 3 is a front elevational view of the device removed from the projector and with the picture disc holder removed.
Figure 4:
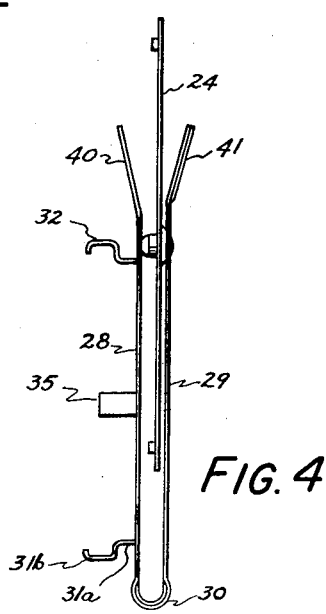
Fig. 4 is an edge elevational view thereof with the picture disc holder in position.

As best shown in Fig. 2, the projector includes a lamp housing 10 containing the usual light source and condensing lens system. Supported from the base 11, which also supports the housing, by an upwardly extending support 12, is the lens holder 13. The projecting lens system is supported by a barrel or mount 14 and is adjustable in the holder 13 for focusing purposes by telescoping the lens mount in the holder. The end of the lens holder 13 toward the housing 10 is provided with a square base plate 15, the plate being disposed in spaced relation to the housing. As previously stated, this structure is one which is available on the market. Normally, a slide holder for showing single slides would be mounted on the plate 15 between the plate and the housing, but in this instance, it has been removed to show the structure prior to the installation of my device.

Figure 7:
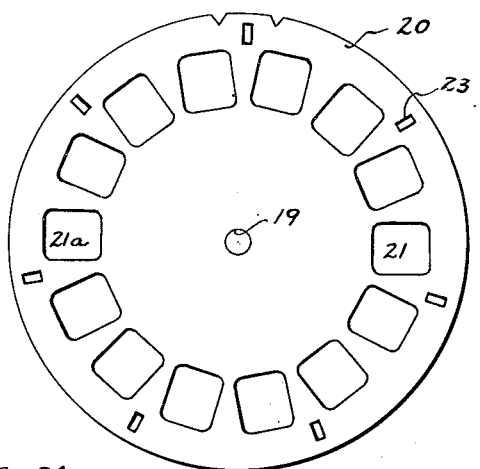
Fig. 7 is a view of a picture disc.
Figure 8:
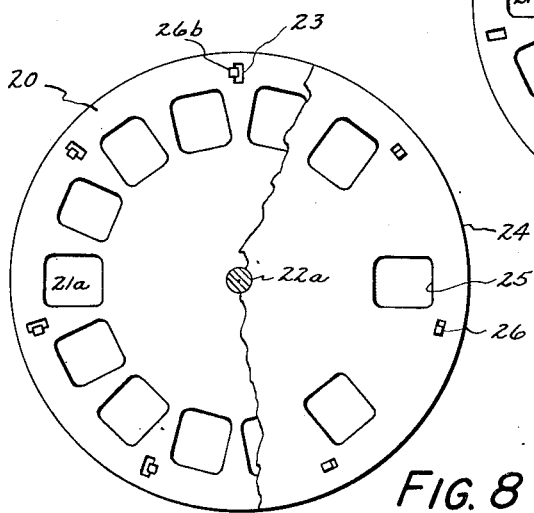
Fig. 8 is a view of the picture disc holder and the picture disc in assembled relation, with the picture disc broken away to show the holder.

Fig. 7 shows a picture disc which is currently available on the market. It may comprise a pair of heavy paper sheets 20 approximately 3⅝ inches in diameter. Diametrically across the sheets from each other, there are provided picture windows 21 and 21a, and between the sheets and in alignment with each of the windows are the individual pictures. The pictures at these diametrically opposite points are the same scene taken slightly displaced from each other, to provide the three dimensional effects which are well known. The present discs have fourteen such openings to thus provide seven scenes. Intermediate the windows are rectangular openings 23 which are normally engaged by a lever in the hand viewer for advancing the picture from one scene to another.

Means is provided to support the above described picture disc and at the same time block off one of each of the pairs of pictures. The blocking off is desirable since otherwise, when the picture 21a ultimately got around to the position of picture 21, it would be upside down.

Figure 5:
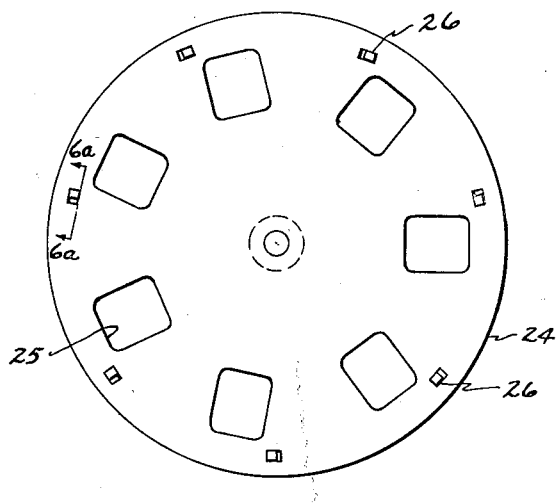
Fig. 5 is a front view of a picture disc holder.
Figure 6:
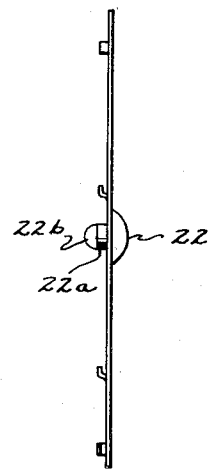
Fig. 6 is an edge view thereof.
Figure 6A:
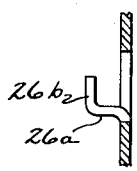
Fig. 6a is a section taken on the line 6a—6a of Fig. 5.

In addition, this means protects the picture disc from bending or other damage. Furthermore, the picture disc is secured in a steadier manner so that it will not vibrate during projection and to prevent a blurred view as well as secure better alignment and framing of the pictures during projection. The means is embodied in a metallic supporting disc 24 as is shown in Figs. 5 and 6 in which are provided openings 25 spaced so that when the picture disc 20 is in place thereon, each opening is aligned with a picture in the picture disc 20 and the alternate or upside down pictures are blocked off. A center pin for the disc is provided and comprises a head 22, disposed at one side of the disc, and having a shank 22a extending through the disc and terminating in a rounded end 22b on the other side of the disc. Locating lugs 26 are spaced around the supporting disc 24, Figs. 5 and 6a, for alignment with the openings 23 in the picture disc 20. When the picture disc 20 is placed on the supporting disc 24, it can be readily centered by the pin 22a—22b which enters the center hole 19 in the disc, and the pictures will be in proper relation to the openings 25 when the lugs 26 are engaged in the openings 23. Preferably, the lugs are struck from the metal of the disc and comprise an outwardly extending portion 26a and a laterally extending tongue 26b. This enables the picture disc to be rotated on the support disc so that the lugs 26 interlock with the disc adjacent openings 23 in the holder.

Means for supporting the combined support and picture in the projection disc is provided and includes a carrier which may be formed of sheet metal and includes a pair of spaced parallel walls 28—29 joined together at one end by a semi-circular section 30. Lugs 31 and 32 are struck out of the side 28. Each comprises an outwardly extending portion 31a which supports a channel 31b. The channel being of a width to embrace the plate 15. The lugs 32 are spaced as shown to allow sufficient space therebetween in which a hole 33 may be formed. This hole is smaller than the shank 22a of the center pin for the support disc and serves as a bearing for engagement with the end 22b. Likewise, the opposite plate is provided with a large opening 34, the edge of which engages with and provides a bearing surface for the head 22 of the centering pin. A stop lug 35 is also struck from the side 28. This lug is so located that the carrier 27 can be slid down over the plate 15 to its proper position and there be stopped by the lug 35 which engages the upper edge of the base plate 15.

Openings 36 are cut through both of the side members 28 and 29 located so that when the carrier is in place in the projector, the openings will be in line with the lamp housing 10 and the projecting lens system. The holes 33 and 34 are of such size that the head 22 and rounded end of the shank 22b of the centering pin will be retained in them but will not go through. The springiness of the sides 28 and 29 then will hold the pin and its discs in place and, at the same time, the pin holds the sides 28 and 29 apart in proper spaced relationship.

Extending from each of the sides 28 and 29 in diverging relationship to each other are ears 40 and 41. The divergence of the ears makes it easier to slide the picture support and its disc into the carrier. At least one of the ears 41 is provided with a guide channel 42 which is wide at the edge of the ear and narrows as it extends inwardly. The channel is adapted to engage and guide the head 22 of the centering pin when the disc is inserted in the carrier.

In operation, the carrier is placed in position by engaging the lugs 31 and 32 with the plate 15 on the projector after which the carrier is slid down between the lamp housing and the lens holder into a position which is determined by the stop lug 35. The picture disc 20 and support disc 24 are then locked together as described. The combined discs are then inserted between the ears 40—41 until the centering pin engages in the channel 42 which extends sufficiently close to the bearing holes 33—34 that the centering pin may be pushed from the channel into the bearing holes, where it snaps into the holes 33—34. Then with the projecting light turned on, the support disc with its picture disc can be turned until a picture is lined up with the openings 36 at which time it will then be projected onto a suitable screen.

Inasmuch as the wall 28 of the holder is held in fixed relation to the base plate 15, this serves as an index for determining the correct positioning of the pictures in the lens system for proper projection thereof. Since the wall 29 is flexibly connected to the wall 28 by the section 30, it can readily be sprung apart by the ears 40—41 for removal of the picture. The divergence of the ears is sufficient to enable the centering pin to be inserted therebetween upon insertion of the support disc in the device without pushing the ears apart. The centering pin engaging in the holes 33—34 also positions the picture in proper relation to the lens system being held securely by the resiliency of the wall 29 through its connection 30. The part 30 may be upset as shown at 30a to provide additional stiffness thereto if desired.

A modification of my invention for use with a different type of projector in which the slide holder is mounted in a socket in the projector is shown in Figs. 9 and 10. In this modification, the slide lugs 31 and 32 and stop lug 34 are eliminated. Instead the carrier is constructed with a socket engaging portion 43 which is so formed that it may be inserted into the slide-holder mounting socket on the projector. This socket engaging portion 43 may be provided with a detent opening 44 which engages with a spring detent on the projector and which serves to locate the carrier in its proper position relative to the light source and lens systems of the projector. In this instance, since the device is engaged on opposite sides by the socket on the projector, the walls 28' and 29' cannot move relative to each other. Furthermore, since the spacing between the walls 28'—29' must be fixed in order to properly engage with the socket, the spacing happens to be greater than in the case of the previous embodiment. Therefore, the ear 40' which is somewhat longer than the ear 40 is connected to the wall 29' by a curved portion or angle bend 50.

The other ear 41' is provided with a tongue 52 which is struck from the metal of the ear and extends inwardly from the wall 28' but in substantially parallel relation thereto. This ear is formed with the opening 34' for engagement with the head 22 of the centering pin. The ear 40' is provided with the guide channel 54 which serves the same purpose as that previously described, the difference being that the channel starts farther in from the extremity of the ear. The tongue 52 thus provides a resilient, springy support for holding the entering pin, the stem end 22b of which engages in the opening 55. The operation of this device is essentially the same as described before, except that instead of sliding the slide lugs 31 and 32 down over plate 15, the socket engaging portion 43 is inserted into the socket on the projector until the detent opening 44 engages the detent on the projector at which point the openings 35 are properly aligned with the lens system.

It will thus be seen that I have provided a device which may be adapted to a standard picture projector for the projection of commercially made pictures, thus making available to the public a wide variety of subjects in a very economical manner.

The construction is such that even the least mechanically minded persons can install or remove the same without tools and in a minimum of time. By using the standard projection, the cost of an additional projector for these types of pictures is eliminated, thus resulting in a great savings to the consumer, as well as reducing the amount of equipment which would otherwise be necessary. Furthermore, the device does not mutilate or otherwise harm the pictures and prevent subsequent use in the manner intended.

Having thus described my invention in some embodiments thereof, I am aware that numerous and extensive departures may be made therefrom without departing from the spirit or scope of the invention as circumscribed by the following claims.

I claim:

1. An adaptor for engagement in a projector comprising in combination a carrier member adapted to be mounted on the projector and having a pair of spaced parallel walls, said walls being formed to provide projection openings in alignment with each other and the optical system of the projector, and a slide holder supported removably in said carrier member, a guide pin carried by said slide holder, said spaced walls having diverging extensions and at least one of said extensions being formed to provide a groove for guiding said guide pin into place upon insertion of said slide holder into said carrier member.

2. An adaptor for engagement in a projector comprising in combination a carrier member adapted to be mounted on the projector and having a pair of spaced parallel walls, said walls being formed to provide projection openings in alignment with each other and the optical system of the projector, and a slide holder supported removably in said carrier member, a guide pin carried by said slide holder, said spaced walls having diverging extensions and at least one of said extensions being formed to provide a groove for guiding said guide pin into place upon insertion of said slide holder into said carrier member, and said walls formed with detents in alignment with said groove for receiving said guide pin.

3. An adaptor for engagement in a projector comprising in combination a carrier member adapted to be mounted on the projector and having a pair of spaced parallel walls, said walls being formed to provide projection openings in alignment with each other and the optical system of the projector, and a slide holder supported removably in said carrier member, a guide pin carried by said slide holder, said spaced walls having diverging extensions and at least one of said extensions being formed to provide a groove for guiding said guide pin into place upon insertion of said slide holder into said carrier member, and said walls formed with detents in alignment with said groove for receiving said guide pin, at least one of said walls being formed of flexible material adapted to be sprung away from the other wall to release said guide pin from said detents.

4. For adapting stereoscopic slides for projection in a slide projector, said stereoscopic slides comprising circular picture discs having pairs of pictures mounted thereon, one of each pair being disposed in diametric opposition to its mate; an adaptor including a carrier member mounted on the projector, means for holding said picture discs and for blocking off one of each pair of the stereoscopic pictures comprising a supporting disc of stiff material having openings formed therein for registration with one of each pair of pictures and the portions of the supporting disc between said openings blocking off the alternate pictures, lugs on said supporting disc for interlocking engagement with openings in the picture disc to hold the picture disc and maintain the said registration, a pin for the center of said supporting disc for engagement in a center opening on the picture disc and engaging said carrier member to hold said supporting disc in position.

5. For adapting stereoscopic slides for projection in a slide projector, said stereoscopic slides comprising circular picture discs having pairs of pictures mounted thereon, one of each pair being disposed in diametric opposition to its mate; an adaptor including a carrier member mounted on the projector, means for holding said picture discs and for blocking off one of each pair of the stereoscopic pictures comprising a supporting disc of stiff material having openings formed therein for registration with one of each pair of pictures and the portions of the supporting disc between said openings blocking off the alternate pictures, lugs on said supporting disc for interlocking engagement with openings in the picture disc to hold the picture disc and maintain the said registration, a pin for the center of said supporting disc for engagement in a center opening on the picture disc and engaging said carrier member to hold said supporting disc in position, said carrier member being formed with a guide way for guiding the pin during insertion of said supporting disc into said carrier member.

6. For adapting stereoscopic slides for projection in a slide projector, said stereoscopic slides comprising circular picture discs having pairs of pictures mounted thereon, one of each pair being disposed in diametric opposition to its mate; an adaptor including a carrier member mounted on the projector, means for holding said picture discs and for blocking off one of each pair of the stereoscopic pictures comprising a supporting disc of stiff material having openings formed therein for registration with one of each pair of pictures and the portions of the supporting disc between said openings blocking off the alternate pictures, lugs on said supporting disc for interlocking engagement with openings in the picture disc to hold the picture disc and maintain the said registration, a pin for the center of said supporting disc for engagement in a center opening on the picture disc and engaging said carrier member to hold said supporting disc in position, said carrier member being formed with a guide way for guiding the pin during insertion of said supporting disc into said carrier member, and having detents in alignment with the guide way for engagement with the pin to provide a bearing for pivotally holding the supporting and picture discs.

7. For adapting and supporting stereoscopic slides for projection in a slide projector, each of said stereoscopic slides comprising a disc having a plurality of pictures arranged for viewing in pairs, one of each of the pairs being diametrically opposed to its mate, and being formed with openings adjacent the periphery for engagement by an indexing mechanism and an opening in the center for engagement with a support; an adaptor comprising a carrier member for replacement of the slide holder of the projector including a pair of spaced parallel side walls for locking engagement in the projector, said side walls being formed to provide framing openings in alignment with each other and the optical system of the projector, and provided with extensions which diverge from each and form finger grips and entering guides for the picture, at least one of said extensions being flexible and movable toward and away from the other, a guide groove formed in one of said extensions being wide at the entrance and narrowing progressively inwardly, and a pair of detents formed in said walls in axial alignment with said guide groove, and a picture holder comprising a supporting disc formed with spaced picture openings arranged for alignment with one of each pair of pictures on the disc and the material between said openings adapted to block off the alternate pictures, locking and positioning lugs on the supporting disc comprising members extending from the wall of the holder and then laterally, arranged for interlocking engagement in the holes in the picture disc, and a center pin on said supporting disc for engagement in the center hole on the picture disc and having ends extending out from the side of the disc, one of said ends being adapted to be guided in said guide grooves upon insertion of said discs into said carrier member and both ends being adapted for removable supporting engagement in said detents.

8. For adapting and supporting stereoscopic slides for projection in a slide projector, each of said stereoscopic slides comprising a disc having a plurality of pictures arranged for viewing in pairs, one of each of the pairs being diametrically opposed to its mate, and being formed with openings adjacent the periphery for engagement by an indexing mechanism and an opening in the center for engagement with a support; an adaptor comprising a carrier member for replacement of the slide holder of the projector including a pair of spaced parallel side walls for locking engagement in the projector, said side walls being formed to provide framing openings in alignment with each other and the optical system of the projector, and provided with extensions which diverge from each and form finger grips and entering guides for the picture, at least one of said extensions being flexible and movable toward and away from the other, a guide groove formed in one of said extensions being wide at the entrance and narrowing progressively inwardly, and a pair of detents formed in said walls in axial alignment with said guide groove, and a picture holder comprising a supporting disc formed with spaced picture openings arranged for alignment with one of each pair of pictures on the disc and the material between said openings adapted to block off the alternate pictures, locking and positioning lugs on the supporting disc comprising members extending from the wall of the holder and then laterally, arranged for interlocking engagement in the holes in the picture disc, and a center pin on said supporting disc for engagement in the center hole on the picture disc and having ends extending out from the side of the disc, one of said ends being adapted to be guided in said guide grooves upon insertion of said discs into said carrier member and both ends being adapted for removable supporting engagement in said detents, one of said detents being formed with a resilient tongue struck from one of said walls, said tongue being movable by one of said extensions.

CHESTER A. COX.

REFERENCES CITED

The following references are of record in the file of this patent:

UNITED STATES PATENTS

| Number | Name | Date |
|---|---|---|
| 826,264 | McEachern | July 17, 1906 |
| 1,012,945 | Warner | Dec. 26, 1911 |
| 1,058,445 | Lessing | Apr. 8, 1913 |
| 1,186,192 | Hoffman | June 6, 1916 |
| 1,313,241 | Ashley | Aug. 19, 1919 |
| 1,965,687 | Chase | July 10, 1934 |
| 1,975,017 | Orde | Sept. 25, 1934 |
| 2,095,171 | Cook | Oct. 5, 1937 |
| 2,189,285 | Gruber | Feb. 6, 1940 |
| 2,364,627 | Fassin | Dec. 12, 1944 |
| 2,369,483 | Musebeck | Feb. 13, 1945 |

FOREIGN PATENTS

| Number | Country | Date |
|---|---|---|
| 542,325 | Great Britain | Jan. 5, 1942 |